United States Patent
Zwinger et al.

(10) Patent No.: US 8,162,595 B2
(45) Date of Patent: Apr. 24, 2012

(54) MITIGATING MECHANICAL VIBRATIONS CAUSED BY A FAN IN A COMPUTER SYSTEM

(75) Inventors: Steven F. Zwinger, Poway, CA (US); Kenny C. Gross, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 536 days.

(21) Appl. No.: 12/435,976

(22) Filed: May 5, 2009

(65) Prior Publication Data
US 2010/0284781 A1 Nov. 11, 2010

(51) Int. Cl.
*F01B 25/26* (2006.01)
*F01D 25/00* (2006.01)
*F03B 11/00* (2006.01)

(52) U.S. Cl. .............. 415/118; 415/119; 415/1

(58) Field of Classification Search .......... 415/15, 415/119, 126; 416/500
See application file for complete search history.

(56) References Cited

U.S. PATENT DOCUMENTS

| | | | | |
|---|---|---|---|---|
| 5,415,522 | A * | 5/1995 | Pla et al. | 415/118 |
| 5,423,658 | A * | 6/1995 | Pla et al. | 415/118 |
| 7,481,116 | B1 * | 1/2009 | Osborn | 73/660 |
| 2005/0254340 | A1 * | 11/2005 | Grebius | 366/139 |
| 2010/0028134 | A1 * | 2/2010 | Slapak et al. | 415/119 |

* cited by examiner

*Primary Examiner* — Sheila V Clark
(74) *Attorney, Agent, or Firm* — Park, Vaughan, Fleming & Dowler LLP

(57) ABSTRACT

One embodiment provides a system that mitigates vibrations caused by cooling fans in a computer system. More specifically, the system includes a cooling fan mechanically coupled to the chassis of the computer system, wherein vibrations generated by the cooling fan are coupled to the chassis. The system also includes an actuation mechanism that creates a relative displacement between the cooling fan and the chassis when a control signal is applied to the actuation mechanism. The system additionally includes a detection mechanism which detects the relative displacement and generates a feedback signal which represents the relative displacement. The system further includes a control signal generation mechanism which converts the feedback signal into the control signal, which is subsequently applied to the actuation mechanism. When the control signal is applied to the actuation mechanism, the relative displacement between the cooling fan and the chassis vibrationally decouples the cooling fan from the chassis.

20 Claims, 3 Drawing Sheets

ELECTROMAGNETIC SUSPENSION (EMS) SYSTEM 200

MITIGATING MECHANICAL VIBRATIONS CAUSED BY A FAN IN A COMPUTER SYSTEM

BACKGROUND

1. Field

Embodiments of the present invention generally relate to techniques for improving the vibrational health of computer systems. More specifically, embodiments of the present invention relate to techniques for damping vibrations caused by cooling fans in a computer system.

2. Related Art

In today's computer systems, cooling fans are becoming increasingly more powerful and can consequently generate significant mechanical vibrations during computer system operation. Such vibrations can propagate to other computer system components which are mechanically coupled to the same chassis structures. These fan-induced vibrations can cause performance degradation and reliability problems for computer system components, such as interconnects, motors, and hard-disk drives (HDDs). In particular, HDDs have become increasingly sensitive to vibration-induced performance degradation, and excessive vibrations can cause drastic degradation of read and/or write throughput for the HDDs.

Some conventional techniques for damping the fan-induced vibrations in computer systems involve inserting elastomeric isolation materials, such as foams, polymers, and natural rubber pads of various thicknesses, between the fans and the chassis structures. Unfortunately, these isolation materials typically suffer from long-term deterioration problems due to elastomeric aging mechanisms.

Hence, what is needed is a method and apparatus that facilitates isolating fan vibrations from vibration-sensitive devices without the above-described problems.

SUMMARY

One embodiment provides a system that mitigates vibrations caused by cooling fans in a computer system. This system includes a cooling fan mechanically coupled to the chassis of the computer system, wherein vibrations generated by the cooling fan are coupled to the chassis. The system also includes an actuation mechanism for creating a relative displacement between the cooling fan and the chassis when a control signal is applied to the actuation mechanism. The system additionally includes a detection mechanism which detects the relative displacement and generates a feedback signal which represents the relative displacement. The system further includes a control signal generation mechanism which converts the feedback signal into the control signal, which is subsequently applied to the actuation mechanism. When the control signal is applied to the actuation mechanism, the relative displacement between the cooling fan and the chassis vibrationally decouples the cooling fan from the chassis.

In some embodiments, the actuation mechanism includes a first electromagnet embedded in the cooling fan and a second electromagnet embedded in the chassis and located in proximity to the first electromagnet. The first electromagnet and the second electromagnet form an electromagnetic suspension (EMS) across the interface between the cooling fan and the chassis. Consequently, when subjected to the control signal, the first and second electromagnets cause magnetic levitation to vibrationally decouple the cooling fan from the chassis.

In some embodiments, the detection mechanism includes a first position sensor embedded in the cooling fan which detects the position of the cooling fan. The detection mechanism also includes a second position sensor embedded in the chassis which detects the position of the chassis.

In some embodiments, the first and second position sensors are accelerometers, wherein each accelerometer is configured to measure both position and trajectory signals.

In some embodiments, the control signal generation mechanism is a servomechanism controller.

In some embodiments, the feedback signal includes both position signals and trajectory signals associated with the cooling fan and the chassis.

In some embodiments, the relative displacement between the cooling fan and the chassis mechanically vibrationally decouples the cooling fan from one or more hard-disk drives (HDDs) which are mechanically coupled to the chassis.

In some embodiments, the accelerometers can include uni-axial accelerometers; bi-axial accelerometers; and tri-axial accelerometers.

In some embodiments, the relative displacement between the cooling fan and the chassis can be a one-dimensional displacement; a two-dimensional displacement; or a three-dimensional displacement.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computer System

Figure 1:
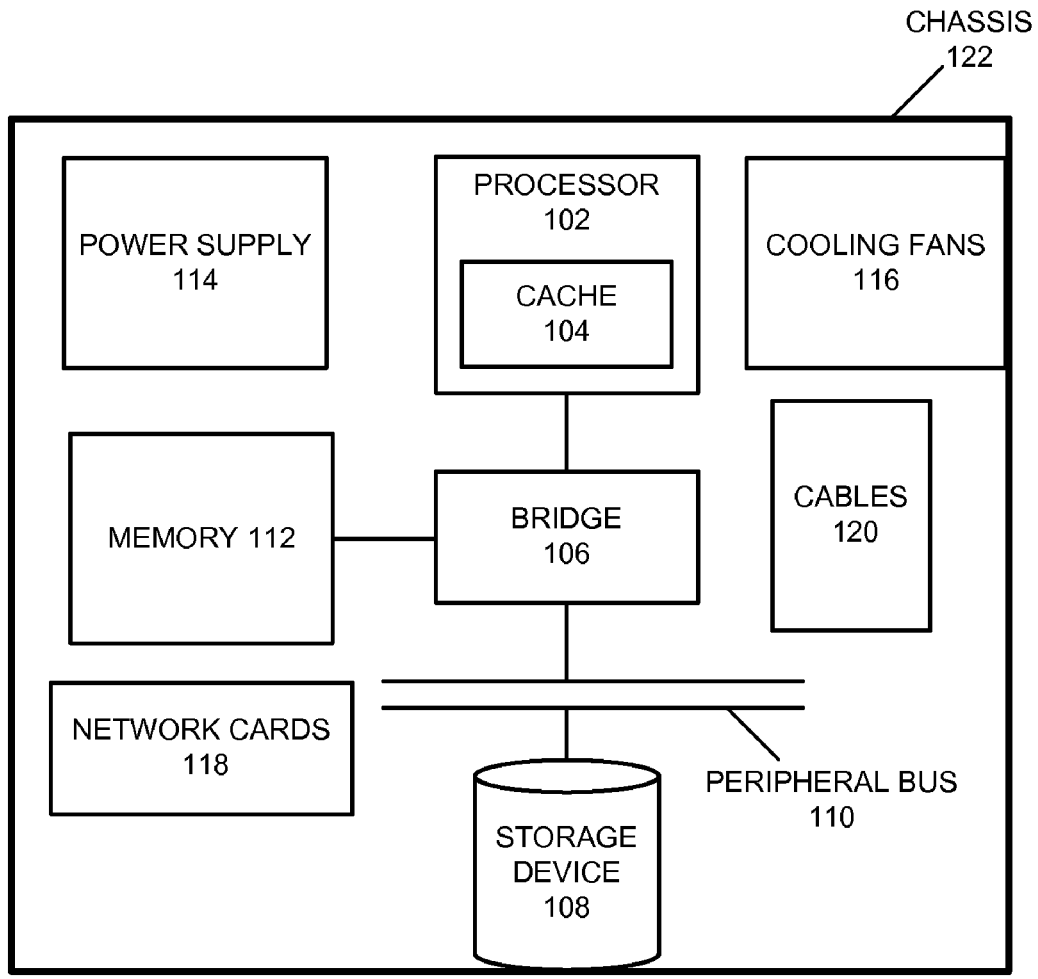
FIG. 1 illustrates a computer system having multiple cooling fans in accordance with an embodiment of the present invention.

FIG. 1 illustrates a computer system 100 having multiple cooling fans 116 in accordance with an embodiment of the present invention. As illustrated in FIG. 1, computer system 100 includes a processor 102, which is coupled to a memory 112 and to peripheral bus 110 through bridge 106. Bridge 106 can generally include any type of circuitry for coupling components of computer system 100 together.

Processor 102 can generally include any type of processor, including, but not limited to, a microprocessor, a mainframe computer, a digital signal processor, a personal organizer, a device controller, a computational engine within an appliance, and any other processor now known or later developed. Furthermore, processor 102 can include one or more cores. Processor 102 includes a cache 104 that stores code and data for execution by processor 102.

Although FIG. 1 illustrates computer system 100 with one processor, computer system 100 can include more than one processor. In a multi-processor configuration, the processors can be located on a single system board, or on multiple system boards. Computer system 100 can include, but is not limited to, a server, a server blade, a datacenter server, a field-replaceable unit, or an enterprise computer system.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices. In particular, storage device 108 can include one or multiple hard-disk drives (HDDs), or an HDD array.

Processor 102 communicates with memory 112 through bridge 106. Memory 112 can include any type of memory that can store code and data for execution by processor 102. This includes, but is not limited to, dynamic random access memory (DRAM), static random access memory (SRAM), flash memory, read-only memory (ROM), and any other type of memory now known or later developed. Note that processor 102, cache 104, bridge 106, peripheral bus 110 and memory 112 are typically located on a system board/motherboard (not shown).

Computer system 100 also includes other system components, which include, but are not limited to, power supply 114, one or more cooling fans 116, network cards 118, and cables 120 that interconnect system components. Furthermore, computer system 100 is enclosed by chassis 122, which provides housing and mechanical supports for the aforementioned computer system components. As cooling fans become increasingly powerful, they can generate significant vibrations during computer system operation. Also note that cooling fans 116 are mechanically coupled to an inner surface of chassis 122, so that the vibrations generated by cooling fans 116 are coupled to chassis 122 and subsequently propagated to other system components which are also mechanically coupled to chassis 122 (e.g., storage device 108).

Note that although computer system 100 is used for the purposes of illustration, embodiments of the present invention can generally be applied to other computer systems, such as desktop computers, workstations, storage arrays, embedded computer systems, automated manufacturing systems, and other computer systems which use one or more rotational cooling devices for system cooling. Hence, the present invention is not limited to the specific implementation of computer system 100 as illustrated in FIG. 1.

Using Electromagnetic Suspension for Vibration Isolation

Figure 2:
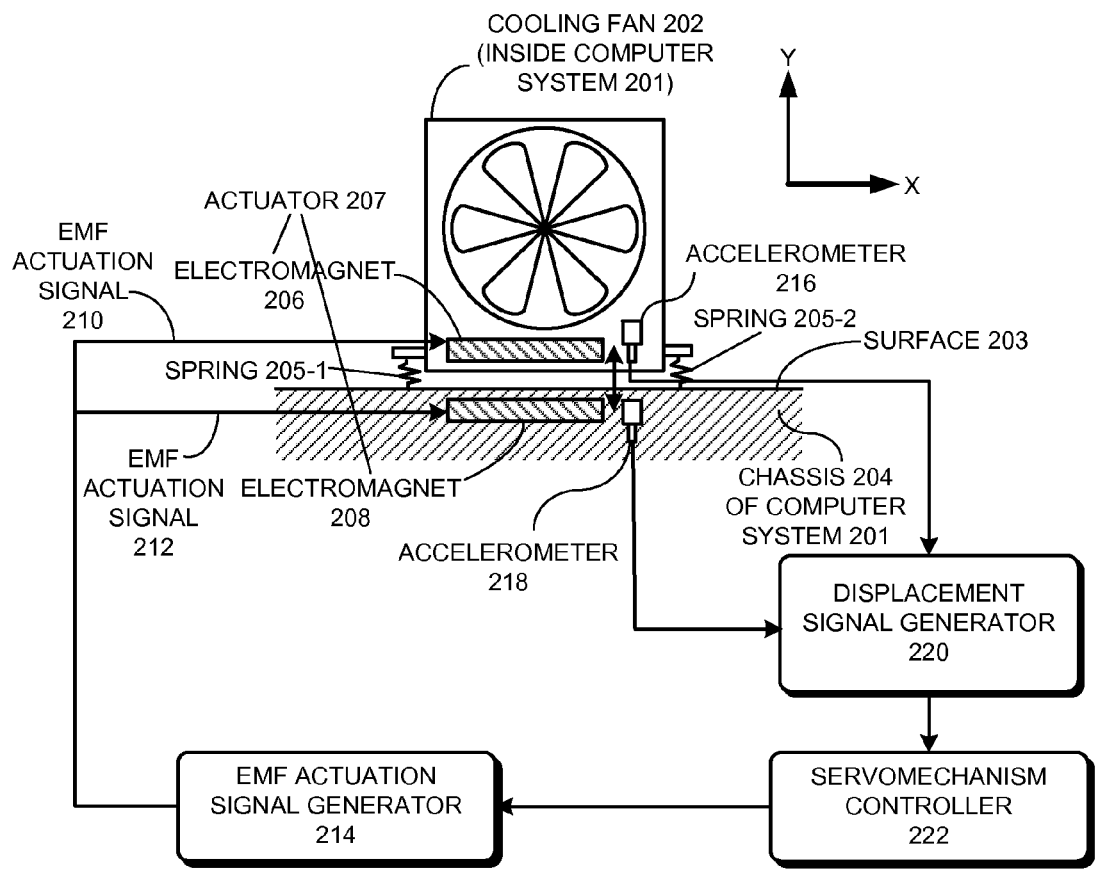
FIG. 2 illustrates an active controlled electromagnetic suspension (EMS) system for isolating vibrations caused by a cooling fan in a computer system in accordance with an embodiment of the present invention.

FIG. 2 illustrates an active controlled electromagnetic suspension (EMS) system 200 for isolating vibrations caused by a cooling fan 202 in a computer system 201 in accordance with an embodiment of the present invention. Note that EMS system 200 may be embedded in computer system 201 (which is not fully shown).

As illustrated in FIG. 2, EMS system 200 includes cooling fan 202 (or "fan 202") to be isolated. The housing of fan 202 may be initially in direct contact with the inner surface 203 of chassis 204 of computer system 201. However, fan 202 does not have to be affixed to chassis 204. In one embodiment, fan 202 lightly coupled to chassis 204 through soft springs 205-1 and 205-2. These soft springs are configured to limit the movement of fan 202 in the horizontal direction while allow freedom of movement of fan 202 in the vertical direction by means of a very small spring constant. However, many other forms of mechanical coupling between fan 202 and chassis 204 can be used in place of the one illustrated in FIG. 2.

Fan 202 includes an actuator 207 which comprises a first electromagnet 206 and a second electromagnet 208. As illustrated in FIG. 2, electromagnet 206 is embedded in the housing of fan 202 in proximity to the surface which may be in contact with chassis 204. Electromagnet 206 faces electromagnet 208 which is embedded in chassis 204. Note that electromagnets 206 and 208 do not have to be the same size. Furthermore, electromagnets 206 and 208 can be driven by respective electromagnetic force (EMF) actuation signals 210 and 212, which are generated from EMF actuation signal generator 214. EMF actuation signal generator 214 is described in more detail below. When EMF actuation signals 210 and 212 are applied, electromagnets 206 and 208 repel each other, thereby causing a magnetic levitation force between fan 202 and chassis 204. This levitation force can create a relative displacement (in the indicated vertical direction next to actuator 207) between fan 202 and chassis 204, allowing fan 202 to be suspended above surface 203, and decoupled from the chassis structure 204. Consequently, mechanical vibrations generated by fan 202 are either damped or completely isolated (i.e., vibrationally decoupled) from the chassis structures. Note that EMF actuation signals 210 and 212 control the amount of electromagnetic force generated by electromagnets 206 and 208 and therefore control the amount of actuation between fan 202 and chassis 204.

Referring to FIG. 2, fan 202 is also integrated with a first accelerometer 216, which is used to detect the position and trajectory of fan 202 during magnetic levitation. Additionally, a second accelerometer 218 is rigidly affixed to chassis 204 to detect the displacement of chassis 204. In one embodiment, accelerometer 218 is embedded in chassis 204 underneath inner surface 203, as shown in FIG. 2. In another embodiment, accelerometer 218 may be rigidly affixed to chassis 204 on top of inner surface 203. In some embodiments, accelerometers 216 and 218 are microelectromechanical system (MEMS) accelerometers. Note that such MEMS accelerometers are typically much smaller than fan 202 and are also inexpensive. Moreover, each accelerometer can be a uni-axial accelerometer, bi-axial accelerometer, or tri-axial accelerometer.

Accelerometers 216 and 218 together determine the relative displacement between fan 202 and chassis 204 in the vertical direction. More specifically, output signals from accelerometers 216 and 218 are coupled to a displacement signal generator 220. Typically, prior to applying EMF actuation signals 210 and 212, the displacement between fan 202 and chassis 204 is set to zero. During the process of magnetic levitation, displacement signal generator 220 determines the displacement of fan 202 from the initial position based on the telemetry signals gathered from both of the accelerometers.

Note that in addition to the displacement caused by magnetic levitation, the relative displacement between fan 202 and chassis 204 can also include displacements caused by mechanical vibrations of both fan 202 and chassis 204. As a result, the amount of levitation may be modulated by these vibration-induced displacements, resulting in uncertainty in the amount of magnetic levitation. In order to achieve stable EMS of fan 202 from chassis 204, the position and trajectory data of fan 202 can be continuously gathered and processed by displacement signal generator 220 to generate real-time displacement data for the fan. This real-time displacement data can then be used to continuously adjust EMF actuation signals 210 and 212 to compensate for the effect of mechanical vibrations.

More specifically, the output from displacement signal generator 220 is fed into servomechanism controller 222, which can adjust the amount of EMS based on the real-time displacement data. For example, if it is found that the relative displacement between fan 202 and chassis 204 is below a desirable minimum value, servomechanism controller 222 can cause an increase of magnitudes in the EMF actuation signals. As shown in FIG. 2, this is achieved by using the output from servomechanism controller 222 to control EMF actuation signal generator 214, which is configured to convert the servomechanism controller output into desired EMF actuation signals 210 and 212. Hence, displacement signal generator 220, servomechanism controller 222, and EMF actuation signal generator 214 form a feedback control loop which can achieve stable magnetic levitation of fan 202.

Figure 3A:
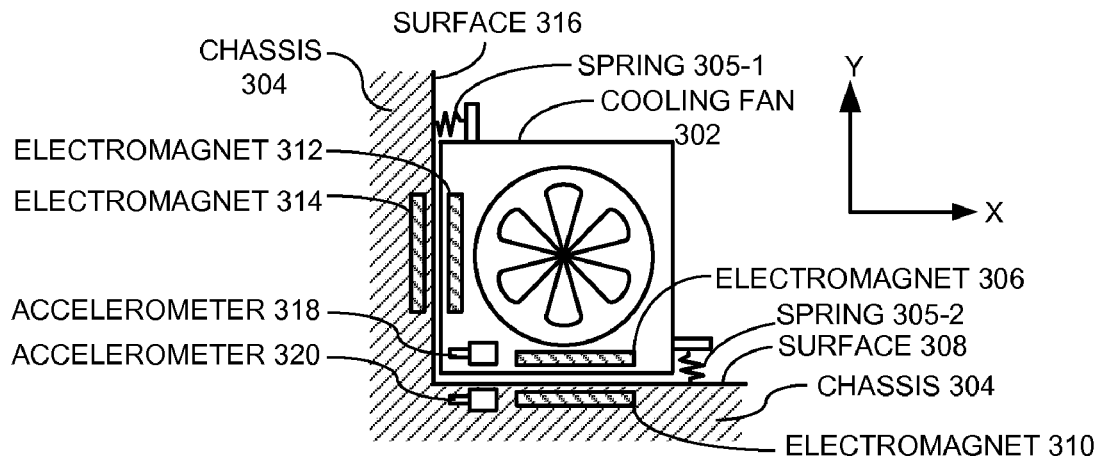
FIG. 3A illustrates a system for decoupling a fan from a chassis through 2D magnetic levitation in accordance with an embodiment of the present invention.
Figure 3B:
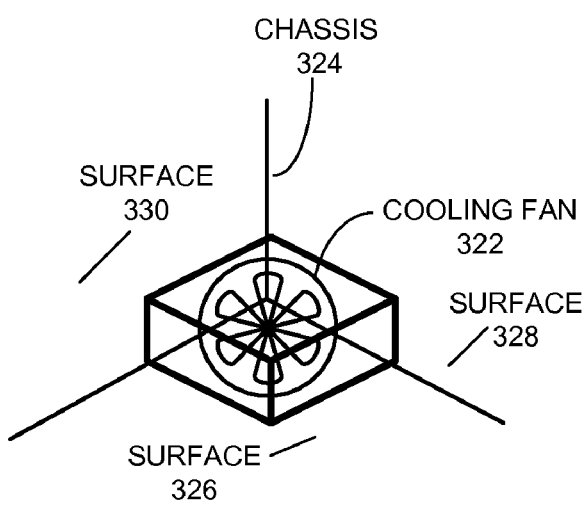
FIG. 3B illustrates a system for decoupling a fan from a chassis through 3D magnetic levitation in accordance with an embodiment of the present invention.

Although FIG. 2 illustrates a system for performing vibration decoupling between chassis and fan in one-dimension (1D), generally the EMS-based vibration-decoupling technique can be performed in 2D or 3D. FIGS. 3A and 3B illustrate systems for performing vibration decoupling between fans and chassis structures in multiple dimensions. Specifically, FIG. 3A illustrates a system for decoupling a fan 302 from a chassis 304 through 2D magnetic levitation in accordance with an embodiment of the present invention. More specifically, fan 302 which is placed inside a computer system is in contact with two adjacent surfaces of chassis 304. In one embodiment, fan 302 is lightly coupled to chassis 304 through soft springs 305-1 and 305-2. These soft springs are configured to confine the movement of fan 302 in both the horizontal and vertical directions when fan 302 is in contact with chassis 304. However, many other forms of mechanical coupling between fan 302 and chassis 304 can be used in place of the one illustrated in FIG. 3.

In this embodiment, two actuators wherein each of which is comprised of a set of electromagnets are used to facilitate magnetic levitation in both x-(i.e., the vertical) and y-(i.e., the horizontal) directions. As shown in FIG. 3A, a first electromagnet 306 is integrated with fan 302 and faces horizontal surface 308 of chassis 304, while a second electromagnet 310 is rigidly affixed underneath surface 308 of chassis 304.

The pair of electromagnets 306 and 310, when driven by proper EMF actuation signals, magnetically levitate fan 302 in the y-direction, which subsequently achieves damping or isolation of vibrations caused by fan 302 in the same direction. Similarly, a second pair of electromagnets 312 and 314 is embedded in the left-hand side of fan 302 and a vertical surface 316 of chassis 304, respectively. The second pair of electromagnets magnetically levitates fan 302 in the x-direction, thereby damping out vibration caused by fan 302 in the x-direction. Hence, the two pairs of electromagnets in FIG. 3A can create 2D displacement of fan 302 relative to chassis 304 in the x-y plane.

In one embodiment, the relative displacement between fan 302 and chassis 304 is inferred by real-time telemetry of the vector difference between a pair of bi-axial MEMS accelerometers 318 and 320, wherein accelerometer 318 is integrated with fan 302, while accelerometer 320 is rigidly affixed to chassis 304. In this case, the actuation directions of the bi-axial accelerometers are aligned with the x- and y-directions, respectively. During EMS operation, the bi-axial accelerometers simultaneously measure position and trajectory signals in two orthogonal directions (the x- and y-directions). These electromagnets can be driven by a servomechanism feedback system similar to the one illustrated in FIG. 2. More specifically, the 2D accelerometer telemetry signals are used to generate EMF actuation signals for both sets of electromagnets in FIG. 3A to adjust the 2D displacement of fan 302 relative to chassis 304 in both x- and y-directions. In some embodiments, tri-axial accelerometers can be used instead of bi-axial accelerometers.

FIG. 3B illustrates a system for decoupling a fan 322 from a chassis 324 through 3D magnetic levitation in accordance with an embodiment of the present invention. More specifically, fan 322 which is placed inside a computer system is making contact with three adjacent surfaces of chassis 324. In this embodiment, for each pair of contacting surfaces (i.e., one from fan 322 and one from chassis 324), a pair of electromagnets is used to magnetically levitate in the direction perpendicular to the pair of surfaces (the electromagnets are not shown in FIG. 3B). Overall, three electromagnets are integrated with fan 322 and three complementing electromagnets are embedded in chassis 324 underneath the three orthogonal surfaces 326, 328, and 330. These electromagnets can be driven by a servomechanism feedback system similar to the one illustrated in FIG. 2 to cause a 3D displacement of fan 322 relative to chassis 324 in a 3D space. In one embodiment, the relative displacement between fan 322 and chassis 324 is inferred by real-time telemetry of the vector difference between a pair of tri-axis MEMS accelerometers (not shown in FIG. 3B), wherein one accelerometer is integrated with fan 322, and the other accelerometer is rigidly affixed to chassis 324.

In both fan-chassis configurations of FIG. 3A and FIG. 3B, it is possible to selectively apply magnetic levitation in only one direction. In one embodiment, this direction can be the one which causes the greatest performance degradation for HDDs coupled to the chassis structures. For example in FIG. 3A, the system can separately apply magnetic levitation in the x- and y-directions, and for each direction, can determine the corresponding improvement on throughput of HDDs. Next, during normal operation, the system can only apply EMF actuation signals to the selected direction, thereby simplifying the feedback control mechanism. In another embodiment of the present invention, this selected direction can be the one which facilitates damping out vibrations in certain frequencies that are similar to the natural resonant frequencies of the HDDs, and/or frequencies to which the HDDs are known to have a high vibrational sensitivity.

While we have described decoupling vibrations between the fans and the sensitive HDDs by applying magnetic levitation to the fans, it is also possible to magnetically levitate the HDDs, thereby isolating the HDDs from the chassis structures and the fan-induced vibrations. In practice, it may be more efficient to decouple the fans from the chassis because there are typically many fewer fans in computer systems than HDDs. Furthermore, the technique described above can be readily extended to other vibration-sensitive components and vibration sources within a computer system. Hence, the present invention is not limited to the specific implementation of EMS system 200 as illustrated in FIG. 2, and those illustrated in FIGS. 3A and 3B.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system that mitigates vibrations caused by cooling fans in a computer system, comprising:
   a cooling fan mechanically coupled to the chassis of the computer system, wherein vibrations generated by the cooling fan are coupled to the chassis;
   an actuation mechanism configured to create a relative displacement between the cooling fan and the chassis when a control signal is applied to the actuation mechanism;
   a detection mechanism configured to detect the relative displacement and generate a feedback signal which represents the relative displacement; and
   a control-signal-generation mechanism configured to convert the feedback signal into the control signal, which is subsequently applied to the actuation mechanism;
   wherein the control signal is generated so that the relative displacement between the cooling fan and the chassis vibrationally decouples the cooling fan from the chassis.

2. The system of claim 1, wherein the actuation mechanism comprises:
   a first electromagnet embedded in the cooling fan; and
   a second electromagnet embedded in the chassis and located in proximity to the first electromagnet, wherein the first electromagnet and the second electromagnet form an electromagnetic suspension (EMS) across the interface between the cooling fan and the chassis,
   wherein when subjected to the control signal, the first and second electromagnets cause magnetic levitation to vibrationally decouple the cooling fan from the chassis.

3. The system of claim 1, wherein the detection mechanism comprises:
   a first position sensor embedded in the cooling fan configured to detect the position of the cooling fan; and
   a second position sensor embedded in the chassis configured to detect the position of the chassis.

4. The system of claim 3, wherein the first and second position sensors are accelerometers, wherein each accelerometer is configured to measure both position and trajectory signals.

5. The system of claim 1, wherein the control-signal-generation mechanism is a servomechanism controller.

6. The system of claim 1, wherein the feedback signal includes both position signals and trajectory signals associated with the cooling fan and the chassis.

7. The system of claim 1, wherein the relative displacement between the cooling fan and the chassis decouples the vibrational decoupling between the cooling fan and one or more hard-disk drives (HDDs) mechanically coupled to the chassis.

8. The system of claim 2, wherein the accelerometers can be:
   uni-axial accelerometers;
   bi-axial accelerometers; and
   tri-axial accelerometers.

9. The system of claim 1, wherein the actuation mechanism is configured to create the relative displacement between the cooling fan and the chassis as:
   a one-dimensional displacement;
   a two-dimensional displacement; or
   a three-dimensional displacement.

10. A method that mitigates vibrations caused by cooling fans in a computer system, comprising:
    creating a relative displacement between a cooling fan and a chassis of the computer system using an actuation mechanism by applying a control signal to the actuation mechanism;
    detecting the relative displacement and generating a feedback signal which represents the relative displacement; and
    converting the feedback signal into the control signal, which is applied to the actuation mechanism,
    wherein the control signal is generated so that the relative displacement between the cooling fan and the chassis vibrationally decouples the cooling fan from the chassis.

11. The method of claim 10, wherein the actuation mechanism comprises:
    a first electromagnet embedded in the cooling fan; and
    a second electromagnet embedded in the chassis and located in proximity to the first electromagnet, wherein the first electromagnet and the second electromagnet form an electromagnetic suspension (EMS) across the interface between the cooling fan and the chassis,
    wherein when subjected to the control signal, the first and second electromagnets cause magnetic levitation to vibrationally decouple the cooling fan from the chassis.

12. The method of claim 10, wherein detecting the relative displacement involves:
    using a first position sensor embedded in the cooling fan to detect the position of the cooling fan; and
    using a second position sensor embedded in the chassis to detect the position of the chassis.

13. The method of claim 12, wherein the first and second position sensors are accelerometers, wherein each accelerometer is configured to measure both position and trajectory signals.

14. The method of claim 10, wherein the method further comprises using a servomechanism controller to convert the feedback signal into the control signal.

15. The method of claim 10, wherein the feedback signal includes both position signals and trajectory signals associated with the cooling fan and the chassis.

16. The method of claim 10, wherein the relative displacement between the cooling fan and the chassis vibrationally decouples the cooling fan from one or more hard-disk drives (HDDs) which are mechanically coupled to the chassis.

17. The method of claim 11, wherein the accelerometers can be:
    uni-axial accelerometers;
    bi-axial accelerometers; and
    tri-axial accelerometers.

18. The method of claim 10, wherein creating the relative displacement between the cooling fan and the chassis involves creating:

a one-dimensional displacement;
a two-dimensional displacement; or
a three-dimensional displacement.

19. An apparatus that mitigates vibrations caused by cooling fans in a computer system, comprising:
- a cooling fan mechanically coupled to the chassis of the computer system, wherein vibrations generated by the cooling fan are coupled to the chassis;
- an actuation mechanism coupled to the cooling fan and configured to create a relative displacement between the cooling fan and the chassis when a control signal is applied to the actuation mechanism;
- a detection mechanism configured to detect the relative displacement and generate a feedback signal which represents the relative displacement; and
- a control-signal-generation mechanism configured to convert the feedback signal into the control signal, which is subsequently applied to the actuation mechanism;
- wherein the control signal is generated so that the relative displacement between the cooling fan and the chassis vibrationally decouples the cooling fan from the chassis.

20. The apparatus of claim 19, wherein the actuation mechanism comprises:
- a first electromagnet embedded in the cooling fan; and
- a second electromagnet embedded in the chassis and located in proximity to the first electromagnet, wherein the first electromagnet and the second electromagnet form an electromagnetic suspension (EMS) across the interface between the cooling fan and the chassis,
- wherein when subjected to the control signal, the first and second electromagnets cause magnetic levitation to vibrationally decouple the cooling fan from the chassis.

* * * * *